(12) United States Patent
Bouchard et al.

(10) Patent No.: US 8,731,160 B2
(45) Date of Patent: *May 20, 2014

(54) SYSTEM, METHOD, AND COMPUTER-READABLE STORAGE MEDIUM FOR TELECOM BILLING OUTSOURCING

(71) Applicant: ITXC IP Holdings S.a.r.l, Luxembourg (LU)

(72) Inventors: Sylvie Bouchard, Lachine (CA); Pascal Montes, Montreal (CA); Michel Decarie, Montreal (CA)

(73) Assignee: ITXC IP Holdings S.a.r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/692,098

(22) Filed: Dec. 3, 2012

(65) Prior Publication Data

US 2013/0089193 A1    Apr. 11, 2013

Related U.S. Application Data

(63) Continuation of application No. 12/751,422, filed on Mar. 31, 2010, now Pat. No. 8,345,842.

(51) Int. Cl.
*H04M 15/00* (2006.01)

(52) U.S. Cl.
USPC .................... 379/114.22; 379/114.03

(58) Field of Classification Search
USPC ............. 379/114.01, 114.03, 114.06, 114.21, 379/114.22, 115.01, 121.03, 126, 127.04; 455/406, 408
See application file for complete search history.

(56) References Cited

U.S. PATENT DOCUMENTS

| | | | | |
|---|---|---|---|---|
| 5,381,467 A | * | 1/1995 | Rosinski et al. | 379/121.01 |
| 5,517,560 A | * | 5/1996 | Greenspan | 379/115.01 |
| 6,298,127 B1 | * | 10/2001 | Petrunka | 379/126 |
| 2003/0165222 A1 | * | 9/2003 | Syrjala et al. | 379/114.26 |

* cited by examiner

*Primary Examiner* — Olisa Anwah

(74) *Attorney, Agent, or Firm* — Kaplan Breyer Schwarz & Ottesen, LLP

(57) ABSTRACT

A system, method, and computer-readable storage medium for outsourcing telecom billing are disclosed for issuing one or more first billing statements and one or more second billing statements from a first telecom network; and transmitting at least the one or more first billing statements to a second telecom network. The one or more first billing statements may reflect one or more charges from the first telecom network to the second telecom network, and the one or more second billing statements may reflect one or more charges from the second telecom network to one or more customers thereof. The one or more charges of the first and second billing statements may reflect the same service(s).

20 Claims, 8 Drawing Sheets

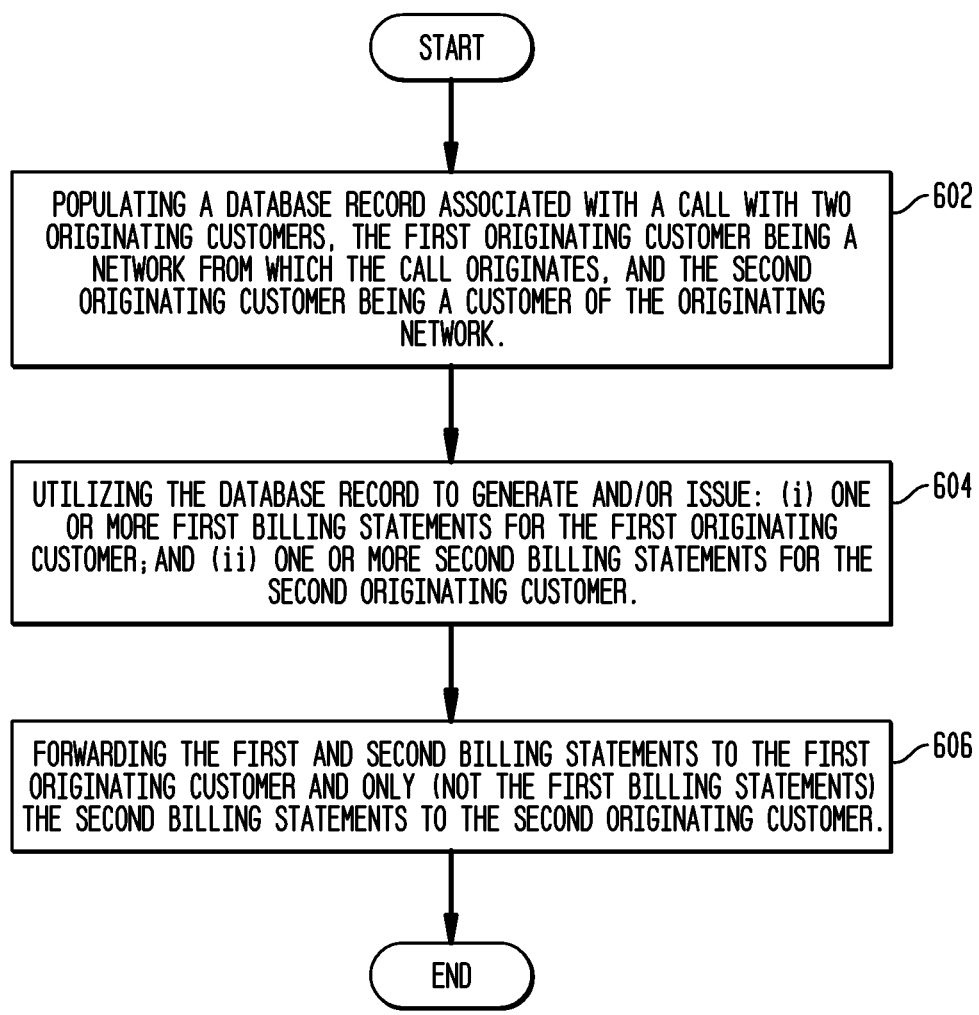

FIG. 7 xxxxxxxxxxxxxx — 81

| Account Number | Invoice Number | Period Ending on | Invoice Date |
|---|---|---|---|
| 020214 | 200000000026 | 2008-10-31 | 2008-11-12 |

80

Page 2 of 2

Services

Attachment 101

| | Amount Cur. |
|---|---|
| Current Period | 82 |
| Network Usage Changes | |
| VTS (former ITXC) — 83 | X.XX EUR |
| | X.XX EUR |
| Total for Charges | X.XX EUR |

Information

FIG. 8

| Invoice Date | Invoice Number | Summary File | Invoice File | CDR File |
|---|---|---|---|---|
| 11/30/2008 | 58 | | Invoice (600 KB) | |
| 11/30/2008 | 57 | | Invoice (600 KB) | |
| 11/30/2008 | 56 | | Invoice (600 KB) | |
| 11/30/2008 | 55 | | Invoice (622 KB) | |
| 11/30/2008 | 54 | | Invoice (466 KB) | |
| 8/30/2008 | 50 | | Invoice (623 KB) | |
| 5/31/2008 | 51 | | Invoice (757 KB) | |
| 4/30/2008 | 52 | | Invoice (534 KB) | |
| 4/30/2008 | 42 | | | |
| 8/31/2007 | 22 | Summary (353 KB) | | |
| 8/21/2007 | 14 | Summary (353 KB) | | |
| 4/30/2007 | 4 | | Invoice (45 KB) | CDR (7 KB) CDR (7 KB) |
| 4/30/2007 | 3 | | Invoice (45 KB) | CDR (8 KB) CDR (8 KB) |
| 3/31/2007 | 35 | | Invoice (107 KB) | CDR (34 KB) CDR (34 KB) |
| 3/31/2007 | 34 | | Invoice (107 KB) | |
| 2/28/2007 | 11 | | Invoice (627 KB) | |

SYSTEM, METHOD, AND COMPUTER-READABLE STORAGE MEDIUM FOR TELECOM BILLING OUTSOURCING

RELATED APPLICATION

This application is a continuation of application Ser. No. 12/751,422, filed Mar. 31, 2010 Entitled SYSTEM, METHOD, AND COMPUTER-READABLE STORAGE MEDIUM FOR TELECOM BILLING OUTSOURCING. The entirety of the foregoing application is hereby incorporated herein by reference.

FIELD OF THE INVENTION

The present invention is directed to telecommunications networks, and more particularly, to a system, method, and computer-readable storage medium to operate and/or manage outsourced telecommunications billing for use of such networks.

BACKGROUND OF THE INVENTION

In the world of telecommunications, the interaction of a plurality of telecom networks operated by more than one entity has become more prevalent. Calls, texts, and other types of communications may be between different users in many countries, almost anywhere in the world, and provide both voice and data access for such users.

When a user initiates a communication or service that extends beyond his home network (i.e., the network to which the user subscribes) to an additional network, that additional network provides services by connecting the communication (e.g., "bridging", routing, etc. the call). Such services of the additional network benefit both the users involved with the call/communication and the home network of the user. The home network benefits because its customers are able to engage in cross-network communications, thereby making those customers satisfied with the functionality of their home network. Typically, those customers receive one billing statement from their home network; the billing statement lists those services provided by the home network and beyond (e.g., long distance calling, additional services provided by additional network(s), value added services, etc.)

In order to provide the aforementioned billing statements, the various additional networks (if used) must be capable of working with the home network and sending the home network billing information (e.g., billing rates for the additional network, time increments for charges, access fees, etc.). One manner in which this is typically accomplished is that the home network periodically communicates with additional network(s) to obtain up-to-date billing information for the respective network. Additionally, any network(s) providing services for the home network may periodically send a report of the provided services and related costs to the home network. After receipt thereof, the home network may apply the charges to the applicable billing statement(s).

Unfortunately, such periodic updating may involve various inefficiencies, such as, but not limited to, untimely receipt of billing amendments, new contract rate(s), relevant charges in the current billing cycle; delaying charges on a billing statement or invoice; sending more than one invoice to reflect charges from different networks for the same call; etc. Such inefficiencies lead to additional costs of administering such networks. For example, if an additional network connects a call from England to New York City, the additional network may charge ten dollars U.S. total. However, the additional network may not report the ten dollar charge for the call to the home network until after the home network sends a billing statement listing that call and the related charges to the customer. As such, a customer may be charged additionally for a phone call after already paying a previous billing statement or invoice for that same call (i.e., the customer thinks they paid for that service in full when they may have not). Alternatively, the home network may try to avoid confusion from the aforementioned scenario by delaying any charges to the customer for the call until it receives some type of billing information from the additional network(s) involved with the call. As a result, the home network may not receive payment from the customer for its provided services within the normally contracted timeline, thereby leading to the aforementioned inefficiencies. As such, there is a need in the art to prevent imperfect communication between networks, additional administration costs, etc.

In view of the above, it would be desirable to provide a system, method, and computer-readable storage medium that permits the outsourcing of telecom billing and other administrative services, so that a network servicing or interfacing with a second network can provide billing and other administrative services to said second network. It would also be desirable for a telecom wholesale provider to be able to provide billing and other administrative services to another telecom provider to which the wholesale provider provides services. Additionally, whether or not any network provides telecom services to another network, outsourcing by one telecom provider of its administrative and billing functions to another entity is often desirable for business reasons.

SUMMARY OF THE INVENTION

In accordance with one or more embodiments of the present invention, a system, method, and computer-readable storage medium of outsourcing telecommunications billing are provided to issue first and second billing statements within one network, and transmit the first and/or second billing statements to a second network from the first network. The second network may then forward the second billing statement(s) to its customer(s) where applicable. Because one network (rather than both networks) is generating and/or issuing billing statements for services in which it is involved with the additional network, the additional network does not have to re-generate or re-issue invoices for those same services. With such an outsourcing arrangement, the additional network saves on administration costs by avoiding the production of invoices (also referred to as "billing statements") for any services in which the first network is involved. Thus, the present invention of the instant application allows for cost reduction associated with outsourcing telecom billing, and provides for efficient use of administration resources (e.g., manpower, computer power, paper on which invoices are printed, telecommunications or mailing charges involved with sending invoice(s) to the customer(s), etc.).

In accordance with one or more embodiments of the present invention, the system for outsourcing telecom billing includes: a first processor and a second processor, the first processor operating to: issue one or more first billing statements and one or more second billing statements; and transmit at least the one or more first billing statements to the second processor, wherein: the one or more first billing statements reflect one or more charges from a first telecom network to a second telecom network; the one or more second billing statements reflect one or more charges from the second telecom network to one or more customers thereof; and the one or more charges of the first and second billing statements reflect at least one same service. The charges of the first billing statements may reflect one or more services provided by the first telecom network for the second telecom network. The charges of the second billing statements may reflect services provided by the second telecom network for its one or more customers.

The first and second telecom networks may be separated by at least one firewall. The at least one firewall may include at least one of: a gateway; a router; a network node that operates to interface with another network using one or more different protocols; one or more switches; a bridge; a proxy server; a packet filter; one or more application layers; at least one Egress filter; at least one Ingress filter; one or more network address translators ("NATs"); etc. The system may further include one or more means for: (i) receiving the one or more first billing statements and the one or more second billing statements from outside of the firewall; (ii) forwarding the one or more second billing statements to the one or more customers; and (iii) not forwarding the one or more first billing statements to the one or more customers.

Alternatively or additionally, the charges of the one or more first billing statements may reflect one or more services provided by the first telecom network for the second telecom network. The charges of the one or more second billing statements may reflect the services provided by the first telecom network on behalf of the second telecom network for the customers of the second telecom network.

At least one information field on the first and second billing statements for the at least one same service may be customizable. In particular, the information field(s) on the first and second billing statements may be different from each other. The at least one information field may include: the charges; a language; a currency; a provider of the first and second telecom networks; a billing increment; contact information of the first and second telecom network providers; an invoice number; a call statistic; a call destination; a call origin; a call route; customer information (e.g., a customer name, customer phone number, email, fax number, etc.); a budget forecast; etc.

The first telecom network may include the first processor, and the second telecom network may include the second processor. The first processor may operate to transmit the one or more second billing statements to the second processor, and/or the second processor may operate to transmit the one or more second billing statements to the one or more customers of the second network.

At least one of the first and second processors may operate to populate a database record associated with a call with two originating customers. The first originating customer may include a network from which the call originates, and the second originating customer may include a customer of the network originating the call. The network originating the call may include the second telecom network; and the second originating customer may include a customer of the second telecom network. The system may include a record database for storage of the database record(s). The first processor may utilize the database record to generate and/or issue: (i) the one or more first billing statements for the first originating customer; and (ii) the one or more second billing statements for the second originating customer.

The customers of the second telecom network may connect directly to the first telecom network (e.g., as opposed to connecting indirectly through the second telecom network, etc.).

In accordance with another aspect of the present invention, the method of outsourcing telecommunications billing includes: issuing one or more first billing statements and one or more second billing statements with a first telecom network; and transmitting at least the one or more first billing statements from the first telecom network to a second telecom network, wherein: the one or more first billing statements reflect one or more charges from the first telecom network to the second telecom network; the one or more second billing statements reflect one or more charges from the second telecom network to one or more customers thereof; and the one or more charges of the first and second billing statements reflect at least one same service. The method may further include: transmitting the one or more second billing statements to the second telecom network; and transmitting the one or more second billing statements to the one or more customers from the second telecom network.

The method may further include generating at least one different information field on the one or more first and second billing statements for the at least one same service. The at least one different information field may include: the charges; a language; a currency; a provider of the first and second telecom networks; a billing increment; contact information of the first and second telecom network providers; an invoice number; a call statistic; a call destination; a call origin; a call route; customer information (e.g., a customer name, customer phone number, email, fax number, etc.); and a budget forecast.

The method may further include: reflecting one or more services provided by the first telecom network for the second telecom network in the one or more charges of the one or more first billing statements; and reflecting one or more services provided by the second telecom network for the one or more customers thereof in the one or more charges of the one or more second billing statements.

Alternatively or additionally, the method may include: reflecting one or more services provided by the first telecom network for the second telecom network in the one or more charges of the one or more first billing statements; and reflecting one or more services provided by the first telecom network on behalf of the second telecom network for the one or more customers in the one or more charges of the one or more second billing statements. Thus, the method may include connecting the customers of the second telecom network directly to the first telecom network.

The method may include separating the first and second telecom networks by at least one firewall. The at least one firewall may include at least one of: a gateway; a router; a network node that operates to interface with another network using one or more different protocols; a switch; a bridge; a proxy server; a packet filter; one or more application layers; at least one Egress filter; at least one Ingress filter; and one or more network address translators ("NATs"). The method may include: receiving the one or more first billing statements and the one or more second billing statements from outside of the firewall; forwarding the one or more second billing statements to the one or more customers; and not forwarding the one or more first billing statements to the one or more customers.

The method may further include populating a database record associated with a call with two originating customers. The first originating customer may include a network from which the call originates, and he second originating customer may include a customer of the network originating the call. In at least one embodiment, the network originating the call may include the second telecom network; and the second originating customer may include a customer of the second telecom network. The method may further utilize the database record to generate and/or issue: (i) the one or more first billing statements for the first originating customer; and (ii) the one or more second billing statements for the second originating customer.

In accordance with another aspect of the present invention, the computer-readable storage medium for telecom billing outsourcing contains software code operating to cause one or more of a plurality of processors to perform the steps, including: issuing one or more first billing statements and one or more second billing statements from a first telecom network; and transmitting at least the one or more first billing statements to a second telecom network, wherein: the one or more first billing statements reflect one or more charges from the first telecom network to the second telecom network; the one or more second billing statements reflect one or more charges from the second telecom network to one or more customers thereof; and the one or more charges of the first and second billing statements reflect at least one same service.

The present invention of the instant application allows for the first time the outsourcing of telecom billing from one network to another network involved in the services provided, thereby saving on billing-related administration costs.

BRIEF DESCRIPTION OF THE DRAWINGS

For the purposes of illustrating the various aspects of the invention, wherein like numerals indicate like elements, there are shown in the drawings simplified forms that may be employed, it being understood, however, that the invention is not limited by or to the precise arrangements and instrumentalities shown, but rather only by the claims. To assist those of ordinary skill in the relevant art in making and using the subject matter hereof, reference is made to the appended drawings and figures, wherein:

FIG. 5 is a flow diagram of a method of outsourcing telecom billing illustrating how a network and the customers of that network may be at least two customers of a network generating the billing statements in accordance with at least one embodiment of the present invention.

FIG. 7 is a front view of a billing statement or invoice in accordance with at least one embodiment of the present invention.

FIG. 8 is a front view of one or more database records in accordance with at least one embodiment of the present invention.

DETAILED DESCRIPTION OF THE PRESENT INVENTION

A system, method, and computer-readable storage medium are disclosed herein for outsourcing telecommunications billing. The system, method, and computer-readable storage medium may involve a plurality of telecom networks and one or more customers thereof, and in particular, may involve one of the plurality of networks generating and/or issuing first and second billing statements for services provided between the plurality of telecom networks and customers of a chosen network (e.g., an adjacent network, a network from which a call is originating, etc.). With such an outsourcing arrangement, the additional network saves on the aforementioned administration costs/resources by avoiding the production of invoices or billing statements for such services. The additional network also is able to provide complete and accurate reporting for decision and deal makings, for customer service, for network engineering, etc. Furthermore, the additional network may be able to process detailed records faster than if two separate networks handled two separate billing systems for the same service(s) being billed.

Figure 2:
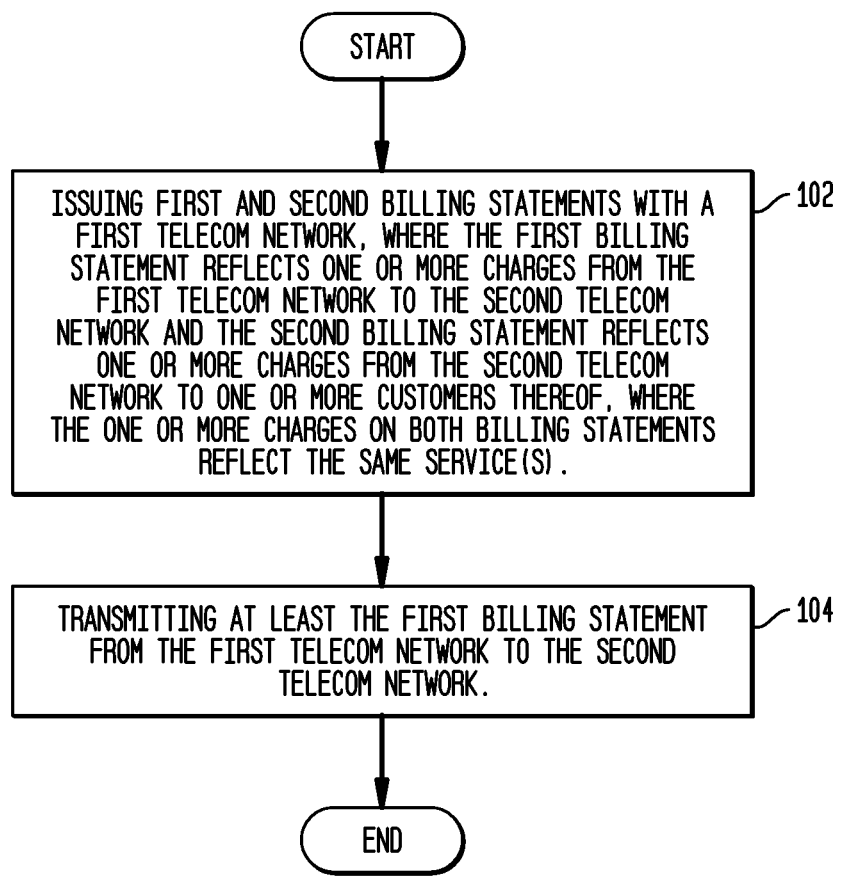
FIG. 2 is a flow diagram of a method of outsourcing telecom billing for use with a plurality of telecom networks in accordance with at least one embodiment of the present invention.

Turning now to the details of the drawings, FIG. 2 is a flow diagram of a method of outsourcing telecom billing in accordance with at least one aspect of the present invention. The method includes: issuing one or more first billing statements and one or more second billing statements with a first telecom network (step 102); and transmitting at least the one or more first billing statements from the first telecom network to a second telecom network (step 104). The one or more first billing statements may reflect one or more charges from the first telecom network to the second telecom network; the one or more second billing statements may reflect one or more charges from the second telecom network to one or more customers thereof; and the one or more charges of the first and second billing statements may reflect at least one same service.

The method may further include: transmitting the second billing statements to the second telecom network; and transmitting the second billing statements to the customers from the second telecom network. The method may further include: reflecting services provided by the first telecom network for the second telecom network in the charges of the first billing statements; and reflecting services provided by the second telecom network for the customers thereof in the charges of the second billing statements.

Alternatively or additionally, the method may include: reflecting services provided by the first telecom network for the second telecom network in the charges of the first billing statements; and reflecting services provided by the first telecom network on behalf of the second telecom network for the customers in the charges of the second billing statements. Thus, the method may include connecting the customers of the second telecom network directly to the first telecom network.

The method may include separating the first and second telecom networks by at least one firewall. The at least one firewall may include at least one of: a gateway; a router; a network node that operates to interface with another network using one or more different protocols; one or more switches; a bridge; a proxy server; a packet filter; one or more application layers; at least one Egress filter; at least one Ingress filter; and one or more network address translators ("NATs"). The method may include: receiving the first billing statements and the second billing statements from outside of the firewall; forwarding the second billing statements to the customers; and not forwarding the first billing statements to the customers.

Although the methods disclosed herein may be employed with additional method steps and telecom billing outsourcing system(s) as described below, those skilled in the art will recognize that the methods for outsourcing telecom billing may be employed with alternative embodiments of telecom systems.

Figure 1:
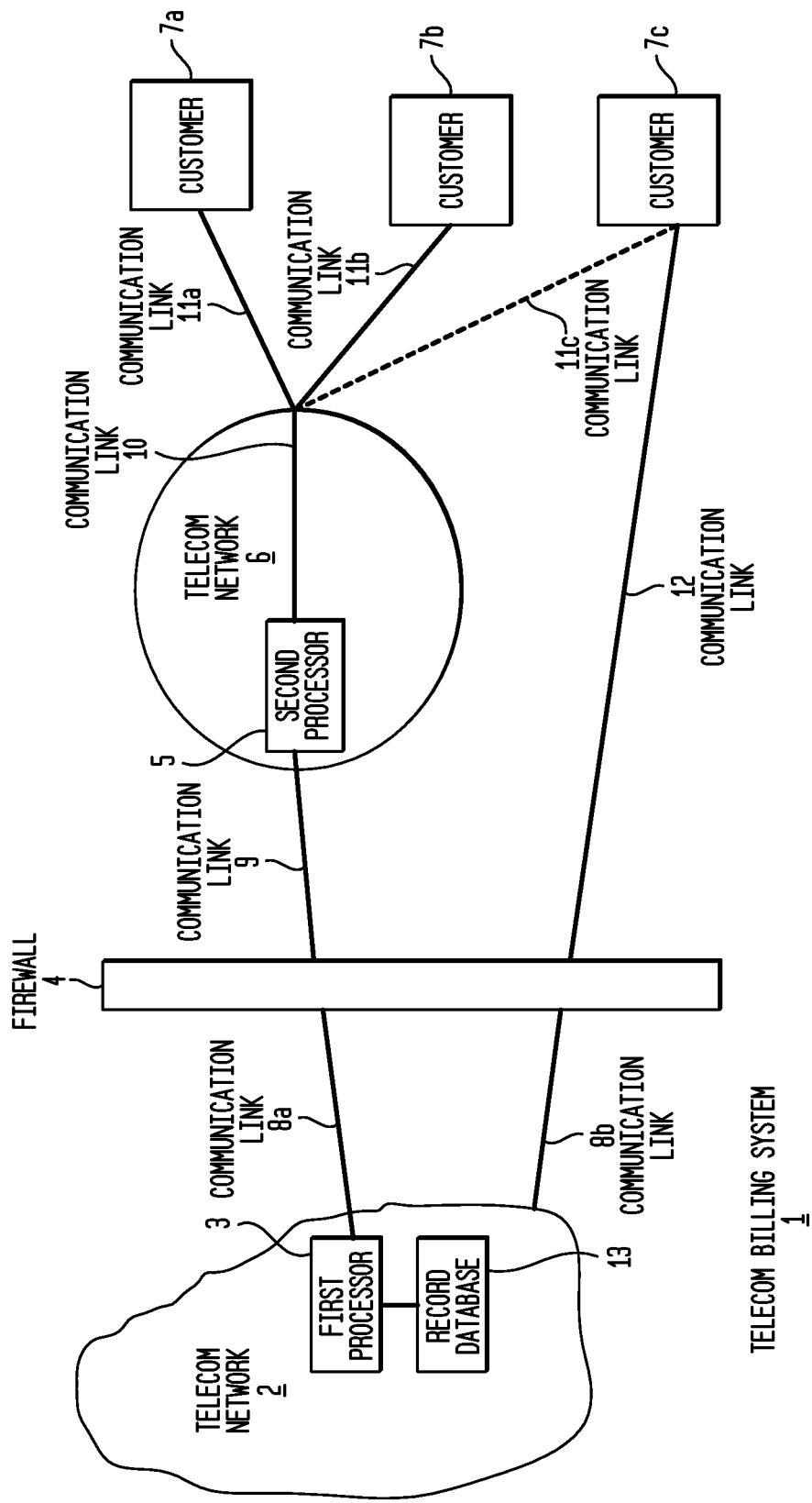
FIG. 1 is a schematic view of a system for outsourcing telecom billing in accordance with at least one embodiment of the present invention.

FIG. 1 shows a schematic view of a system for processing telecom billing outsourcing 1 in accordance with at least another aspect of the present invention. The system 1 includes a first processor (also may be referred to as a "computer") 3 and a second processor (also may be referred to as a "computer") 5. Preferably, the first processor 3 is located within a first telecom network 2, and the second processor 5 is located within a second telecom network 6. The first processor 3 operates to issue one or more first billing statements and one or more second billing statements; and transmit at least the first billing statements to the second processor 5 (e.g., over communication links 8a and 9, through a firewall 4, etc.). The first processor 3 may also transfer the second billing statements to the second processor 5, and the second processor 5 may further transfer or transmit the second billing statements to one or more customers (e.g., customers 7a, 7b, 7c) of the second telecom network 6.

The first billing statements (e.g., invoice 80 as illustrated in FIG. 8 and discussed further below) reflect one or more charges from the first telecom network 2 to the second telecom network 6. For example, the second processor 5 of the second network 6 may outsource the billing administration responsibilities (e.g., generating invoices to bill the customers of the second network 6) to the first processor 3 of the first network 2. As such, charges are owed from the second network 6 to the first network 2 for any outsourced billing services rendered. To perform its billing responsibilities, the first network 2 issues the second billing statements, which reflect charges from the second telecom network 6 to one or more customers 7a, 7b, and 7c of the second network 6. Because the first and second statements or invoices are issued in response to one or more services provided in a predetermined interval (e.g., a billing cycle, etc.), both sets of statements reflect at least one same service (i.e., one statement reflects the relationship between the first and second networks 2 and 6 for a rendered service, and the other statement reflects the relationship between the second network 6 and its customers 7a, 7b, and 7c for the same rendered service).

Because different rates for one or more services may exist between the first and second telecom networks 2 and 6 and between the second telecom network 6 and its customers 7a, 7b, and 7c (e.g., due to different contracted rates, access fees, etc.), the first and second billing statements may list different charges for the same service(s) provided by the first and/or second telecom networks 2 and 6. For example, if customer 7a is located in London, England and initiates a phone call to New York City, the system 1 sends the call over the second network 6 (e.g., via communication links 11a and 10). However, because the second network 6 may only cover the geographic area of the United Kingdom, the second network 6 (e.g., due to a forwarding command initiated by processor 5) may forward the call (e.g., over communication links 8a and 9, through a firewall 4, etc.) to the first network 2 to reach the phone call destination/recipient in New York City. Similarly, the other customers 7b and 7c of the second network 6 may connect to the second network 6 via communication links 11b and 11c, respectively.

Alternatively or additionally, the second billing statements may reflect a charge for a service provided by the first network 2 on behalf of the second network 6 for the customers 7a, 7b, and/or 7c. For example, a customer 7c may not use link 11c to connect indirectly to the first network 2, and may instead connect directly to the first network 2 (e.g., over communication links 12 and 8b, through firewall 4, etc.) when the second network 6 may need to redirect traffic (e.g., due to a bottle neck or excessive traffic in network 6, due to all lines connecting to second network 6 being busy, due to maintenance, etc.). For example, communication link 12 may be available due to the aforementioned agreement between the first and second networks 2 and 6. As such, the customer 7c may not use the second network 6 for a particular phone call. However, because customer 7c is recognized as a customer of the second network 6, the first network 2 is responsible, due to the aforementioned agreement, for generating a billing statement or invoice on behalf of the second network 6 to the customer 7c. Thus, although the customer 7c does not use the second network 6, the invoice that the customer 7c receives may still appear as if it originated from the second network 6.

Figure 3:
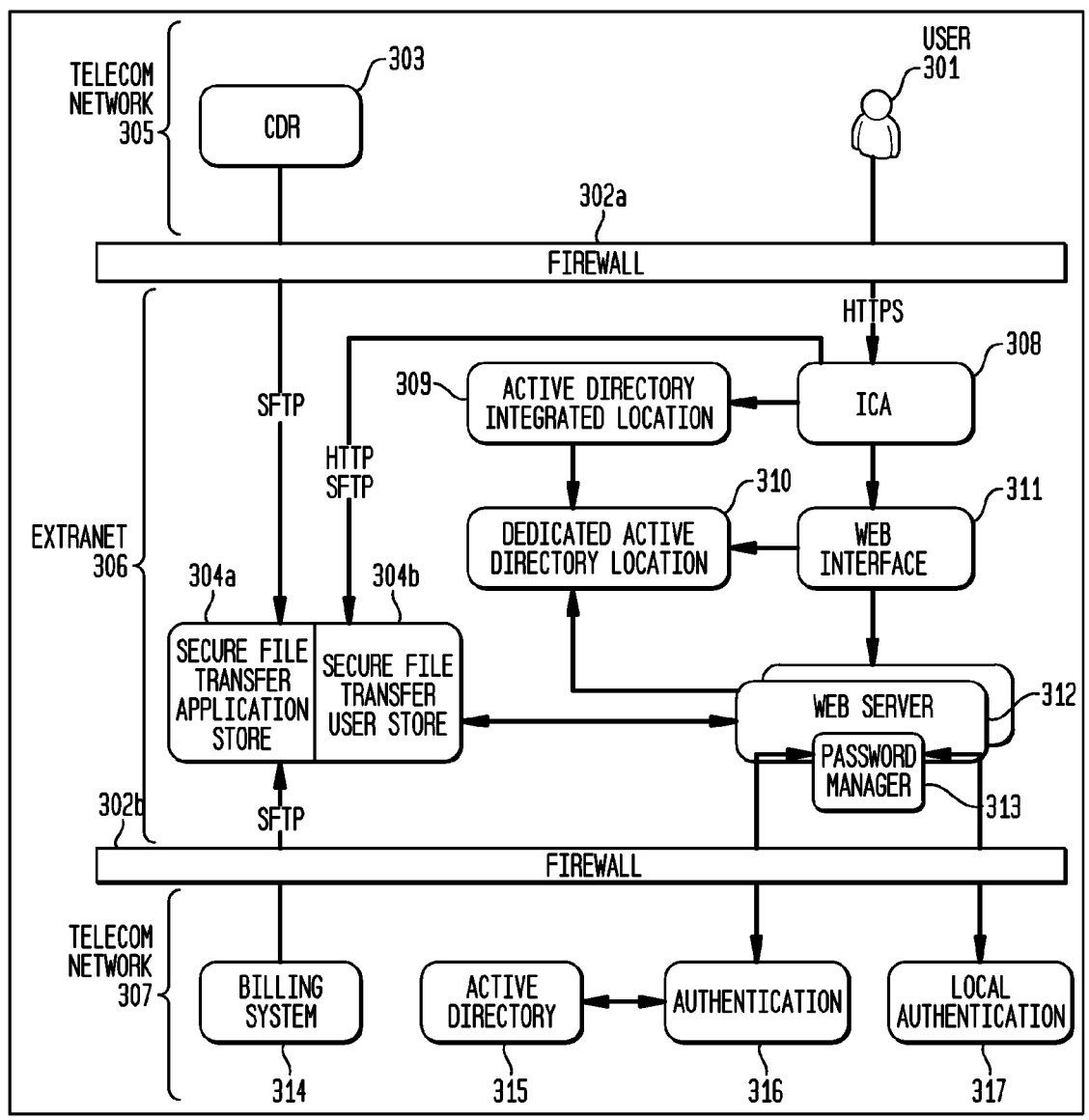
FIG. 3 is a schematic view of a system involving more than one firewall to separate at least two telecom networks in accordance with at least one embodiment of the present invention.

The first and second telecom networks 2 and 6 may be separated by at least one firewall. As best seen in FIG. 1, the first and second telecom networks 2 and 6 may be separated by one firewall 4. Alternatively or additionally, as shown in FIG. 3, a first telecom network 307 and a second telecom network 305 may be separated by two firewalls 302a and 302b with an extranet 306 therebetween. The first telecom network 307 may include a billing system 314 (which may be responsible for outsourced telecom billing as discussed above), web applications for active directory ("AD") authentication 316 and for local authentication 317, and a means for producing the AD 315. The second telecom network 305 may include a Call Detail Record (also referred to as "CDR") application 303, and a user 301 of the second telecom network 305 may need to connect to the first telecom network 307. However, to obtain access to the first telecom network 307, the user 301 may have to obtain authorization via the extranet 306. The extranet 306 may include a secure file transfer application store 304a for transmission of bills between networks 305 and 307 and a secure file transfer user store 304b for referencing when a user 301 tries to access the first network 307. For example, user 301 may submit identification information via a secure protocol (e.g., via hypertext transfer protocol secure or "https") that passes through the first firewall 302a to a virtual private network (also referred to as "VPN") (e.g., secure sockets layer VPN or "SSL VPN", etc.) or independent computing architecture ("ICA") proxy 308. The information may be passed from the VPN or ICA proxy 308 to a web interface 311, which forwards the information to a web server 312 having a password manager 313. The server 312 may compare the information provided to information in the user store 304b and/or in an active directory integrated location 309 or dedicated active directory location 310. The password manager 313 may authenticate the user 301 by communicating with the active directory authentication web application 316 and the local authentication web application 317 through the second firewall 302b.

Figure 4A:
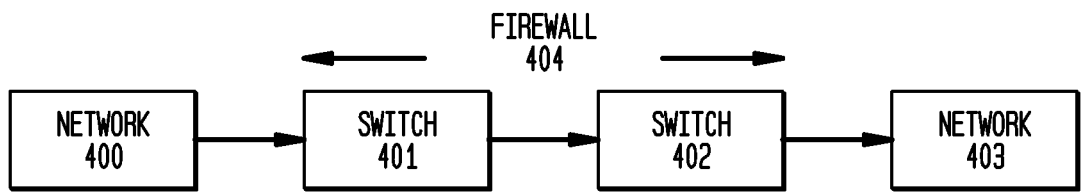
FIGS. 4A-4C are schematic views of at least one type of firewall arrangement separating at least two telecom networks in accordance with at least one embodiment of the present invention.
Figure 4B:
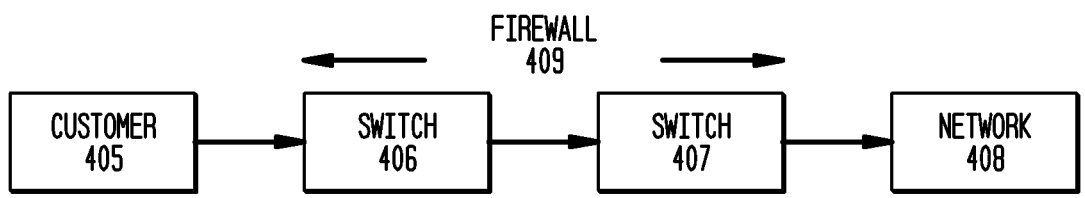
Figure 4C:
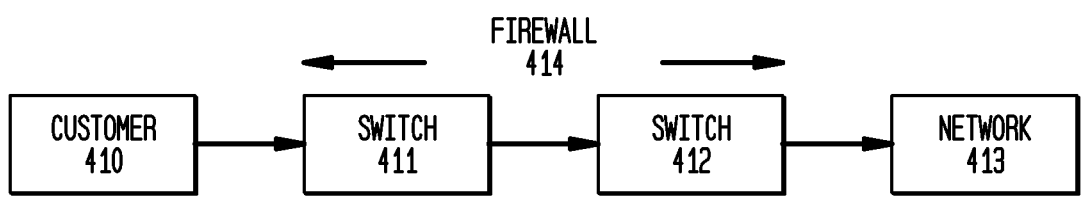

The at least one firewall 4, 302a, 302b may include at least one of: a gateway; a router; a network node that operates to interface with another network using one or more different protocols; one or more switches; a bridge; a proxy server; a packet filter; one or more application layers; at least one Egress filter; at least one Ingress filter; one or more network address translators ("NATs"); etc. As shown in FIGS. 4A-4C, various inbound and outbound firewall devices may be employed depending on the architecture involved. For example as shown in FIG. 4A, egress filtering (i.e., filtering information outbound from one network to another) may occur when a customer (e.g., customers 7a, 7b, 7c, etc.) tries to connect to a first network 403 indirectly from a second network 400 via two switches 401 and 402 of a firewall 404 of the first network 403. As seen in FIG. 4B, egress filtering may occur when a customer 405 of a second network tries to connect to a first network 408 directly through two switches 406 and 407 of a firewall 409 of the first network 408. Alternatively or additionally, as seen in FIG. 4C, ingress filtering (e.g., filtering information inbound from one network to another; verifying the source of one or more incoming packets, etc.) may occur when a first network's customer 410 tries to connect to a second network 413 through two switches 411 and 412 of a firewall 414 of the first network.

The system 1 may further include one or more means (e.g., processors 3 and 5, switches 401 and 402, switches 406 and 407, switches 411 and 412, etc.) for: (i) receiving the one or more first billing statements and the one or more second billing statements from outside of the firewall 4; (ii) forwarding the one or more second billing statements to the one or more customers 7a, 7b, 7c; and (iii) not forwarding the one or more first billing statements to the one or more customers 7a, 7b, 7c.

To efficiently handle and track the services provided, the first network 2 may process traffic of the second network 6 in such a manner where each call may be assigned to two originating customers: (i) the first originating customer may include a network from which the call originates (e.g., the second telecom network 6); and (ii) the second originating customer may include a customer of the network originating the call (e.g., customers 7a, 7b, 7c of the second telecom network 6, etc.). This assignment may permit the processor 3 of the first network 2 to monitor and report traffic per customer and charges based on contracted rates between the first and second originating customers. FIG. 5 illustrates a flow diagram of such handling, which includes populating a database record associated with a call with the two originating customers (step 602). At least one of the first and second processors 3 and 5 may operate to populate the database record. The first telecom network 2 may include a record database 13 (as seen in FIG. 1) for storage of the database record(s). Alternatively or additionally, a record database (e.g., application store 304a, user store 304b, etc.) may be located outside of a first telecom network (e.g., network 307 of FIG. 3). Once a database record is populated, the database record may be utilized to generate and/or issue the first billing statements for the first originating customer, and the second billing statements for the second originating customer (step 604). The first processor 3 of the first telecom network 2 may perform the utilization step. Afterwards, the first and second billing statements may be forwarded to the first originating customer (e.g., the second telecom network 6), and only (i.e., not the first billing statements) the second billing statements may be forwarded to the second originating customer (e.g., customers 7a, 7b, 7c of the second telecom network 6, etc.).

Figure 6:
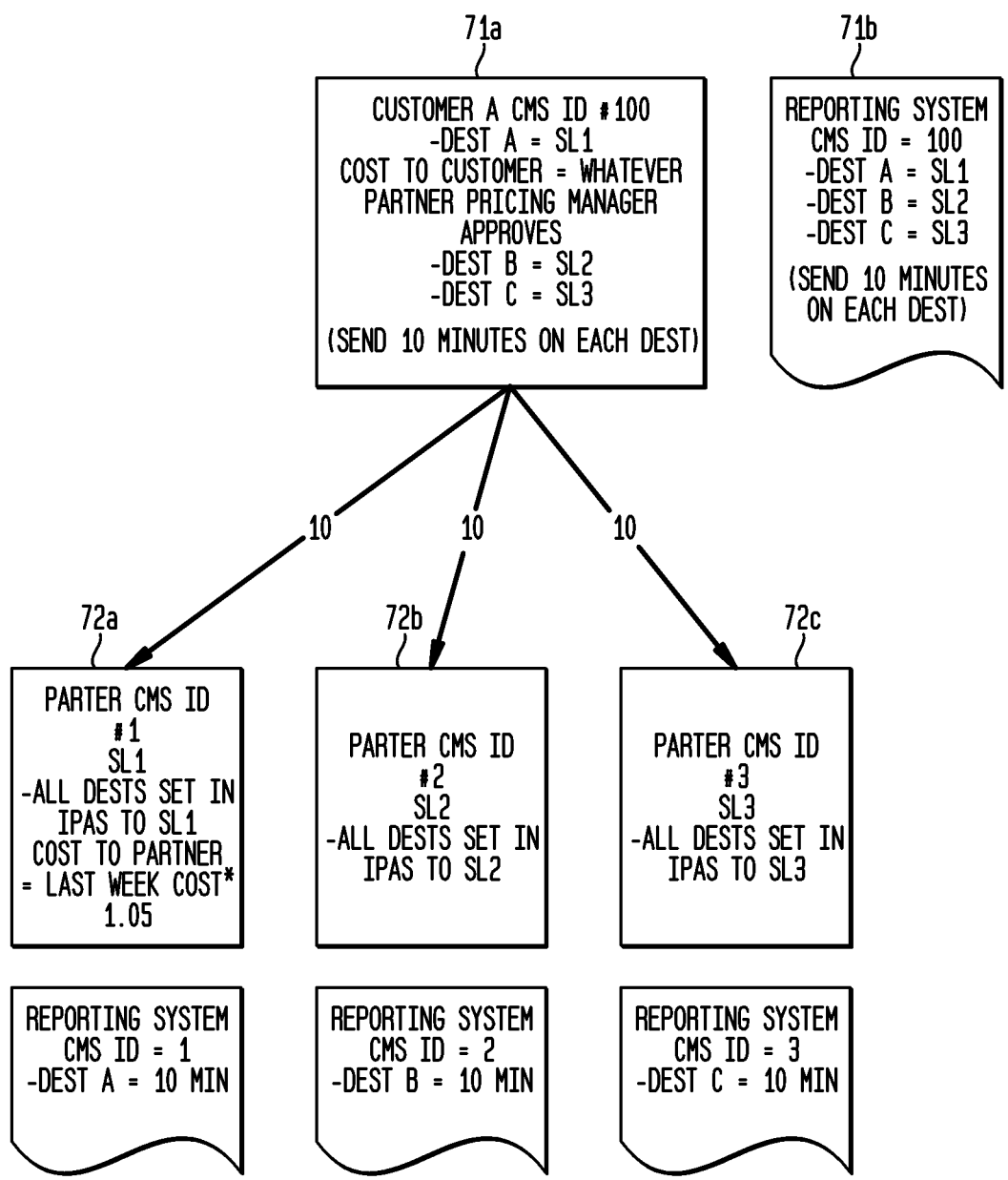
FIG. 6 is a schematic view illustrating viewable content depending on the role of the viewing party in accordance with at least one embodiment of the present invention.

In order to outsource billing, sensitive information, such as, but not limited to, customer names, addresses, phone numbers, billing rates, call duration, time of call, intended recipient, etc., may be transferred between the first and second networks 2 and 6. In order to limit exposure of such information to authorized personnel, the billing system 1 may limit the type(s) of information viewable by employees of the first network 2, employees of the second network 6, employees of the first network 2 overseeing the outsourced billing system 1, etc. For example, as best seen in FIG. 6, a manager of the second network 6 may only see the information in fields 71a and 71b to make sure that the routing requests are sent to the first network 2 correctly. Employees of the first network 2 who do not oversee the outsourced billing may only see fields 72a, 72b, and/or 72c to appropriately route any phone calls where applicable for the requested period of time. Whereas employees (e.g., of the first network 2) who do oversee the outsourced billing may see all CMS IDs, rates and minutes shown in fields 71a, 71b, and 72a-72c, etc. to properly route calls, generate the first and second billing statements, forecast budgets/rates, etc.

The first and second billing statements that are generated (e.g., billing statement 80 as shown in FIG. 7) may include various information fields, such as, but not limited to, information fields 81, 82, 83, etc., which may be customized in numerous ways. At least one different information field may be generated on the one or more first and second billing statements for the at least one same service. The at least one different information field 81, 82, 83 may include: the charges; a language; a currency; a provider of the first and second telecom networks; a billing increment; contact information of the first and second telecom network providers; an invoice number; a call statistic; a call destination; a call origin; a call route; customer information; and a budget forecast. For example, the total charge for the network use of all three customers 7a, 7b, and 7c (e.g., 100 total minutes at $0.08 U.S. per minute for network 6=$8.00 U.S.) of the second network 6 may be displayed in field 82 of an invoice 80 from the first telecom network 2 to the second telecom network 6. However, each individual customer 7a, 7b, and 7c may receive three separate invoices 80 where the charge in field 82 reflects their individual network use (e.g., 20 minutes at $0.09 U.S. per minute for user 7a; 30 minutes at $0.10 U.S. per minute for user 7b; and 50 minutes at $0.085 U.S. per minute for user 7c) and payment owed to the second telecom network 6. A customer's name may be generated in field 81; the amount owed in a predetermined currency (e.g., Euro, U.S. dollar, U.K. pounds, etc.) may be listed in field 82; and the network providing the service(s) may be listed in field 83 of the billing statement or invoice. Billing increments may be configured to be billed at any per second increment needed at the country level (e.g., depending on national and/or international rules/laws, contract agreements from a particular network, etc.). The first and second invoices or billing statements may be generated at any daily frequency, such as, but not limited to, every day, every three days, etc. Any language that uses Latin/Roman characters (e.g., English, Spanish, German, French, etc.) may appear on the billing statements. Other foreign languages may be included based on customer request. Time zones may be adjusted as well depending on the location of a customer, supplier, network, etc. The billing statements may include up to twenty-six time-of-day windows per day, one to seven day-of-week windows, or a combination of the two types of windows. The billing statements may list call durations, including whether there are any minimum or maximum call durations. Billing statements may be transmitted to the customers via any medium known to one skilled in the art, including, but not limited to, certified mail, electronic mail, facsimile, etc.; and may be accessible online (e.g., from the database 13) as discussed below. The billing rates (e.g., rates by customer, rates by destinations, price amendments, etc.) for the second telecom network 6 may be provided to the first telecom network 2 individually or by mass update (e.g., in an excel file upload of customer rates through electronic mail and transmitted via packets across the network, via web interface, etc.)

Now referring to FIG. 8, once one or more billing statements are generated or issued, such statements may be stored in a server or database (e.g., data warehouse/database 507 as shown in FIG. 5, processor/computer 3 and/or processor/computer 5 as shown in FIG. 1, database 13 of network 6 in FIG. 1, etc.), and accessible to a corresponding customer. For example, a customer listed in information field 95 may log into the database to access one or more invoices or billing statements generated for the customer's account. Such access permits customers to conveniently and timely view historical and/or current billing files. The invoice(s) may be listed in an invoice file field 93. Additionally, one or more summary files may be generated for a particular invoice, and may be listed in a summary file filed 92.

At specific intervals, or upon request, an administrator for the customer account or the billing system may generate (e.g., automatically or manually) a call detail record (also referred to as a "CDR"), and may list a CDR in a CDR file field 91. To preserve privacy of user information, a customer may only view files that pertain to his or her account. For example, a customer of the first network 2 may not view documents for a customer of the second network 6, and vice versa. The CDRs and other database records may be used to quickly bill end users, verify invoices, and/or forecast budgets. The CDR files may be created: in a delimited, ASCII format; in a common compression format; in an agreed upon time interval; in a predetermined file size (e.g., to prevent large files from being produced in a backlog situation); with a standard file name (e.g., that includes a date stamp, that includes a time stamp and that includes other information); and with other information. The CDR and other database files may be available for a predetermined time period and/or indefinitely. A user account (e.g., an online/web access RapidCDR account) may be created per billing entity/customer with multiple individual log-ins being provided, which further provides billing data separation/seclusion by customer entity for privacy. Each individual customer of a particular network may obtain access to view the outsourced billing documents, and may download same. Each log-in attempt may be recorded. The login account may be separate from the login account containing first telecom network 2 to second telecom network 6 invoices and supporting documents for the same traffic.

A computer-readable storage medium used commonly, such as, but not limited to, a hard disk, a flash memory, a CD, a DRAM or the like, an optional combination thereof, a server/database, etc. may be used to cause a processor, such as, but not limited to, processor 3 of first telecom network 2, processor 5 of the second telecom network 6, etc. to perform the steps of the methods disclosed herein.

In accordance with at least one aspect of the present invention, the methods, system, and computer-readable storage medium related to the processors 3 and 5 as described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the system illustrated in the figures is shown as having the processor 3 and 5 located within telecom networks 2 and 6, respectively, the processors 3 and 5 may be located outside of the networks 2 and 6, may be integrated with any component, such as the firewall 4, switches 401 and 402, switches 406 and 407, switches 411 and 412, etc. The processors 3 and 5 may also include and/or be made of one or more microprocessors. Still further, the various aspects of the invention may be implemented by way of software and/or firmware program(s) that may be stored on suitable storage medium (e.g., computer-readable storage medium, hard drive, etc.) or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

What is claimed is:

1. A system for processing telecommunications billing outsourcing comprising:
    a first processor and a second processor, the first processor operating to:
        populate a database record that is associated with a call having both a first originating customer and a second originating customer, resulting in a populated database record;
        generate one or more first billing statements for the first originating customer and one or more second billing statements for the second originating customer, by utilizing the populated database record; and
        transmit the one or more first billing statements to the second processor;
    wherein the one or more first billing statements and the one or more second billing statements reflect one or more charges for a same service.

2. The system of claim 1, wherein the first originating customer comprises a network from which the call originates, and wherein the second originating customer comprises a customer of the network originating the call.

3. The system of claim 2, wherein the network originating the call comprises the second processor.

4. The system of claim 2, further comprising a record database operating to store the database record.

5. The system of claim 1, wherein the first processor operates to transmit the one or more second billing statements to the second processor, and wherein the second processor operates to transmit the one or more second billing statements to the one or more customers.

6. The system of claim 1, wherein the second processor operates to refrain from forwarding the one or more first billing statements to the second originating customer.

7. The system of claim 1 wherein the one or more first billing statements reflect at least one charge from a first telecom network to a second telecom network, and wherein the one or more second billing statements reflect at least one charge from the second telecom network to one or more customers thereof.

8. The system of claim 7, wherein the at least one charge of the one or more first billing statements reflect one or more services provided by the first telecom network for the second telecom network, and wherein the at least one charge of the one or more second billing statements reflect one or more services provided by the second telecom network for the one or more customers thereof.

9. The system of claim 1, further comprising:
    a first telecom network, a second telecom network, and at least one firewall separating the first and second telecom networks;
    wherein the at least one firewall comprises at least one of: a gateway, a router, a network node that operates to interface with another network using one or more different protocols, one or more switches, a bridge, a proxy server, a packet filter, one or more application layers, at least one Egress filter, at least one Ingress filter, and one or more network address translators ("NATs").

10. The system of claim 9, wherein the first telecom network comprises the first processor and the second telecom network comprises the second processor.

11. The system of claim 1, wherein the charges on the one or more first billing statements and the charges on the one or more second billing statements for the same service are different from each other.

12. A method of outsourcing telecommunications billing comprising:
   populating, by a first processor, a database record that is associated with a call having both a first originating customer and a second originating customer, resulting in a populated database record;
   generating, by the first processor, one or more first billing statements for the first originating customer and one or more second billing statements for the second originating customer, by utilizing the populated database record; and
   transmitting the one or more first billing statements from the first processor to a second processor;
   wherein the one or more first billing statements and the one or more second billing statements reflect one or more charges for a same service.

13. The method of claim 12, wherein the first originating customer comprises a network from which the call originates, and wherein the second originating customer comprises a customer of the network originating the call.

14. The method of claim 13, wherein the network originating the call comprises the second processor.

15. The method of claim 12, further comprising:
   transmitting the one or more second billing statements from the first processor to the second processor; and
   transmitting the one or more second billing statements from the second processor to the one or more customers.

16. The method of claim 12, wherein the second processor refrains from forwarding the one or more first billing statements to the second originating customer.

17. The method of claim 12 wherein the one or more first billing statements reflect at least one charge from a first telecom network to a second telecom network, and wherein the one or more second billing statements reflect at least one charge from the second telecom network to one or more customers thereof.

18. The method of claim 17, wherein the at least one charge of the one or more first billing statements reflect one or more services provided by the first telecom network for the second telecom network, and wherein the at least one charge of the one or more second billing statements reflect one or more services provided by the second telecom network for the one or more customers thereof.

19. The method of claim 12, wherein the charges on the one or more first billing statements and the charges on the one or more second billing statements for the same service are different from each other.

20. A non-transitory computer-readable storage medium containing software code operating to cause one or more of a plurality of processors to perform the steps comprising:
   populating a database record that is associated with a call having both a first originating customer and a second originating customer, resulting in a populated database record;
   generating one or more first billing statements for the first originating customer and one or more second billing statements for the second originating customer, by utilizing the populated database record; and
   transmitting the one or more first billing statements from a first processor to a second processor;
   wherein the one or more first billing statements and the one or more second billing statements reflect one or more charges for a same service.

* * * * *